United States Patent [19]

Kuhns

[11] Patent Number: 5,040,825
[45] Date of Patent: Aug. 20, 1991

[54] COMBINE HEADER TRANSPORT

[75] Inventor: Abe B. Kuhns, Arthur, Ill.

[73] Assignee: E-Z Trail, Inc., Arthur, Ill.

[21] Appl. No.: 427,247

[22] Filed: Oct. 25, 1989

[51] Int. Cl.⁵ .............................................. B60P 3/00
[52] U.S. Cl. ................................. 280/789; 280/415.1;
280/144; 280/146; 280/DIG. 14
[58] Field of Search ............... 280/414.1, 414.3, 415.1,
280/144, 148, 638, 35, 656, 140–148, 82, 444,
789; 296/3

[56] References Cited

U.S. PATENT DOCUMENTS 3,058,756 10/1962 Holsclaw ........................ 280/414.1
4,105,219 8/1978 Gerson ........................... 280/414.1 X
4,268,211 5/1981 Schwebke ....................... 280/414.1 X

OTHER PUBLICATIONS

Jerry Johnson & Associates, *Head Hauler*, undated.
May Wes Manufacturing, Inc., *Movemaster*, 8/88.
McCurdy, *McCurdy Combine Header Transport*, Copr., 1982.
UFT, *Combine Head Trailer*, undated.
Killbros, *Utility Transport*, undated.

*Primary Examiner*—Mitchell J. Hill
*Assistant Examiner*—Victor E. Johnson
*Attorney, Agent, or Firm*—Lockwood, Alex, FitzGibbon & Cummings

[57] ABSTRACT

The present invention relates to a combine header transport which may be rapidly and easily adjusted to support a wide variety of kinds and shapes of headers for transport. The transport includes an inclined bracket having a slotted sloped surface. A rail having a plate affixed thereto overlies the sloped surface and a second plate underlies the sloped surface. When the plates are loosened relative to each other, the rail may be readily slid along the sloped surface to effect rapid and simultaneous adjustment of the rail in both the transverse horizontal direction and in vertical elevation and, when the adjustment is complete, the plates clamp the inclined bracket.

31 Claims, 2 Drawing Sheets

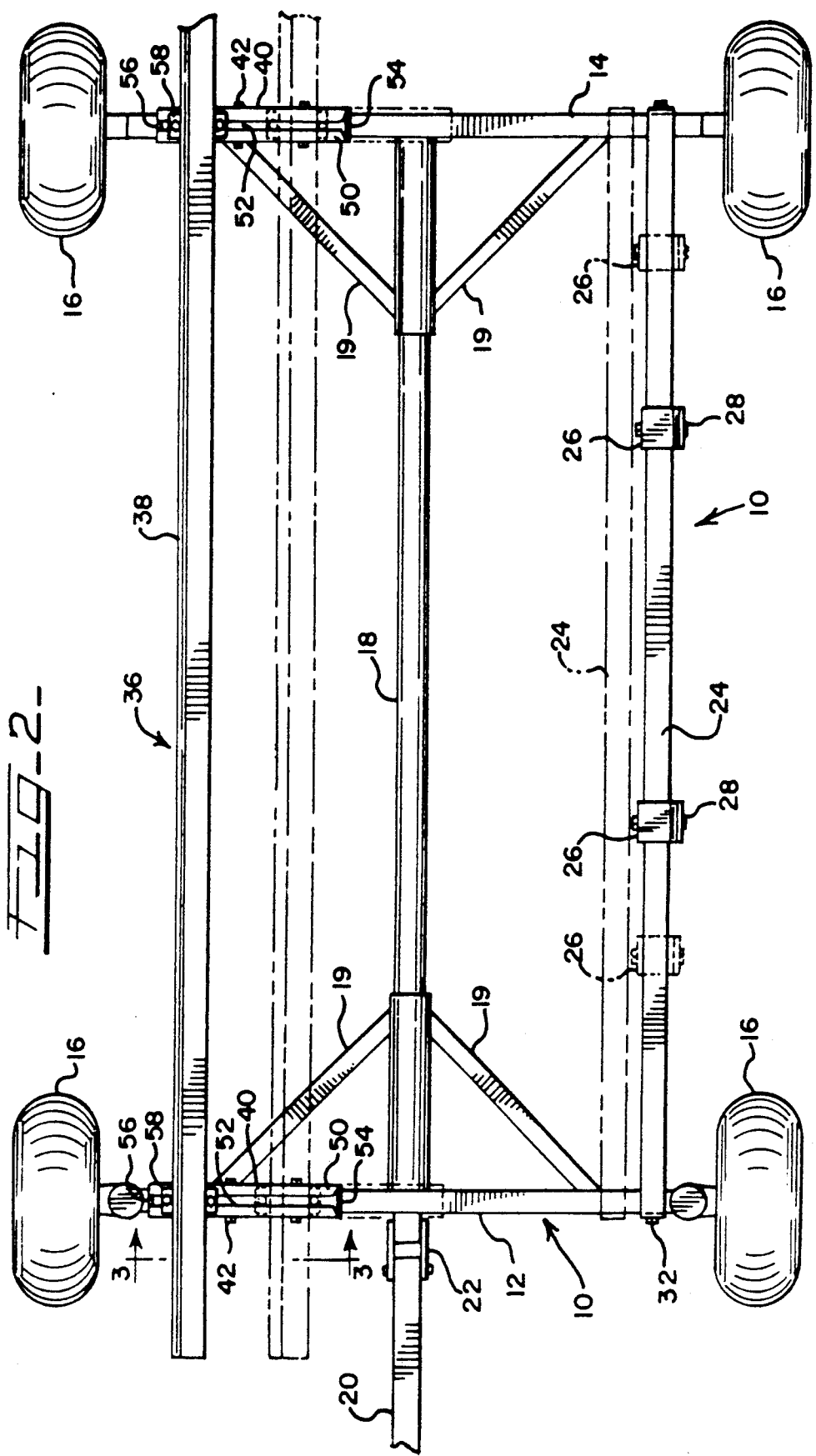

COMBINE HEADER TRANSPORT

BACKGROUND AND SUMMARY OF INVENTION

The present invention relates to a transport for transporting combine headers such as corn, bean and grain headers or tables.

It is desireable to be able to detach the headers from combines to permit safe transit of the combine on public roadways. If the header is not detached from the combine, the overall combine assembly with its header typically would be too large to permit such safe transit. Accordingly, various transports have been known in the past to support the detached combine header and permit its transport separately from the combine. Such headers are of widely varying sizes and shapes depending upon their use, e.g. corn, bean or grain headers, and the identity of their manufacturer. Thus, the prior header transports have included adjustable mechanisms to permit the transport to be adjusted to accept the various shapes and sizes of headers which may need to be transported at different times.

These adjustable transport mechanisms have taken many structural forms and shapes from the very simple to the quite complex. In their simpler structural form, adjustability is achieved by a multiplicity of brackets, bolts and holes which permit adjustment of header support rails or brackets on the chassis of the transport in both the horizontal transverse direction relative to the chassis and in vertical elevation to accommodate the various sizes and shapes of the headers. However, these simpler adjustment assemblies are usually capable of adjustment in only one direction at a time, i.e. either in the horizontal or vertical direction. Thus, although these adjustment mechanisms are structurally simple, in practice they are difficult and time consuming to adjust to fit the particular shape of the combine header to be transported due to the multiple individual and incremental adjustments which are needed in order to accommodate the transport support rails or brackets to fit the size and shape of the particular header. Moreover, because of the multiple adjustments required, adjustment becomes complex and two people are usually required to perform the necessary adjustments.

More structurally complex scissors-type assemblies have also been employed in the past for adjustment of the header support rails or brackets. However, these scissors-type assemblies also usually require the loosening, moving and tightening of a number of bolts and the performance of multiple steps in order to accomplish adjustment in both the horizontal and vertical directions. Again usually more then one person is needed to perform the complex adjustments. Moreover, the scissors-type assemblies, because of their scissoring action, can also be dangerous to the personnel making the adjustments, and these assemblies are frequently excessively high off the roadway resulting in instability during transport.

The combine header transport of the present invention is both simple in construction and use and overcomes the several disadvantages experienced in the prior art header transports. The header transport of the present invention includes an adjustment assembly in which the support for the header may be rapidly and easily simultaneously, rather than incrementally, adjusted in both the transverse horizontal direction and in vertical elevation simply by the loosening and tightening of only a few bolts. The adjustment assembly of the present invention is so simple in construction and use that adjustment may be accomplished easily by a single person and without the hazards attendant in the scissors-type assemblies. Moreover, the header support structure of the transport of the present invention has a low profile and supports the header low to the roadway thus substantially improving stability during transport.

In one principal aspect of the present invention a transport for transporting a large bulky object is provided. The transport has a chassis on wheels for rollably supporting the chassis, a pair of rails spaced longitudinally from each other and extending transversely of the chassis, and first and second support means transversely spaced from each other to support transversely spaced portions of the object when the object is placed on the chassis. The improvement in at least one of said support means comprises at least one inclined bracket having a sloped surface thereon and an elongate sloped slot extending substantially parallel to the sloped surface. The one support means also includes a support element adapted to support the object, and adjustable mounting means mounting the support element for movement along the sloped slot in a direction substantially parallel to the sloped surface to effect movement of the support element simultaneously in both elevation and transversely of the chassis to permit adjustment of the support element to support one of the spaced portions of the object.

In another principal aspect of the present invention, the sloped surface remains stationary during the adjustable movement of the support element.

In still another principal aspect of the present invention, the adjustable mounting means comprises a slot extending parallel to the sloped surface. Plate means both overlies and underlies the slot and the plate means overlying the slot is fixed to the support elements. Coupling means extends between the plate means and through the slot to releaseably engage the plate means with the inclined bracket.

In still another principal aspect of the present invention, the aforementioned slot is in the sloped surface.

In still another principal aspect of the present invention, at least a pair of inclined brackets are spaced from each other longitudinally of the chassis.

In still another principal aspect of the present invention, the sloped surface slopes downwardly toward the the other of the support means.

In still another principal aspect of the present invention, a rail is transversely spaced from the one support means and extends longitudinally of the chassis, and the other support means is mounted on the longitudinally extending rail.

In still another principal aspect of the present invention, adjustable mounting means is provided to mount the other support means for longitudinal movement along the longitudinally extending rail and/or the longitudinally extending rail for transverse movement along the pair of longitudinally spaced transversely extending rails.

In still another principal aspect of the present invention, adjustable mounting means may be provided to also permit transverse movement of the inclined bracket.

In still another principal aspect of the present invention, the support element comprises a rail extending longitudinally of the chassis.

These and other objects, features and advantages of the present invention will be more clearly understood through a consideration of the following detailed description.

BRIEF DESCRIPTION OF THE DRAWINGS

In the course of this description, reference will frequently be made to the attached drawings in which:

FIG. 2 is a plan view of the header transport shown in FIG. 1, and showing various positionings of certain of the adjustable elements of the transport;

BRIEF DESCRIPTION OF THE PREFERRED EMBODIMENT

Figure 1:
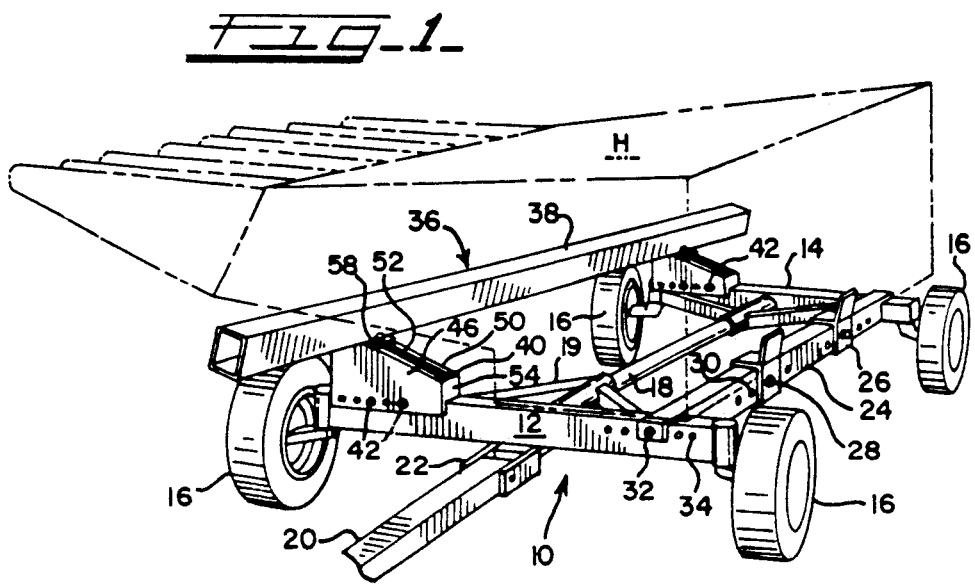
FIG. 1 is a perspective view of a combined header transport constructed in accordance with the principles of the present invention and showing the placement thereon of a typical combine header.

A preferred embodiment of combine header transport constructed in accordance with the principles of the present invention is shown in FIG. 1. The transport comprises a chassis, generally 10, having a pair of rails 12 and 14 which are longitudinally spaced from each other along the chassis and which extend transversely thereof. Wheels 16 are mounted at the ends of the rails 12 and 14 at the four corners of the chassis by suitable and conventional mountings, including bearings and the like (not shown) to rollably support the chassis. The rails 12 and 14 are firmly coupled to each other by a center beam 18 to form the chassis frame for the transport. Although only a single center beam 18 is shown, it will be understood that more then one beam may be provided if desired. In the single beam construction shown, diagonal struts 19 are also preferably provided which extend between the center beam 18 and the front rear rails 12 and 14 to strengthen the transport chassis frame.

A tongue 20 is also coupled to the front rail 12 by a conventional tongue coupling 22 which permits the tongue to both pivot and swivel relative to the rail 12. The tongue 20 may either be of fixed or adjustable length. The tongue may be attached either to the combine itself during transit or to a separate tractor to transport the header.

A rail 24 is also preferably positioned to extend longitudinally of the chassis 10 between the front rail 12 and the rear rail 14. One or more header support rest brackets 26 for supporting a portion of the underside of the header H are adjustably mounted on the rail 24 by bolts 28 which may be selectively positioned in a plurality of holes 30, as shown in FIG. 1. Accordingly, the support brackets 26 may be adjustably located along the length of the rail 24 as shown in solid and dot and dash in FIG. 2. The rail 24 is also preferably adjustably mounted to the rails 12 and 14 by bolts 32 which extend through one or more holes 34 in the rails 12 and 14, as best shown in FIG. 1. Accordingly, not only may the support brackets 26 be adjustably positioned longitudinally along the rail 24, but also the rail 24 itself may be adjustably positioned transversely of the chassis as shown in solid and dot and dash in FIG. 2.

A second header rest support, generally 36, is also mounted on the chassis. This header support 36 is spaced transversely from the rail 24 to support another portion of the underside of the header H as shown in FIG. 1. The header support 36 is adapted to be adjusted in both the transverse horizontal direction and in vertical elevation as will be more fully described to follow.

Figure 4:
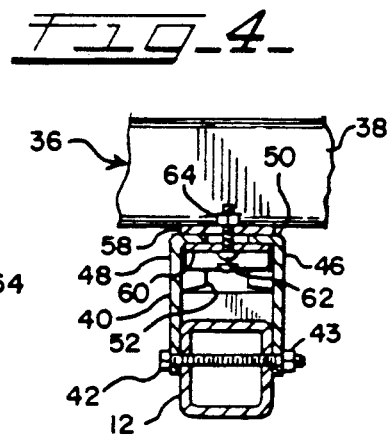
FIG. 4 is a partially broken, cross sectioned side elevational view of the mounting assembly as viewed substantially along lines 4—4 of FIG. 3.

The header rest support 36 preferably comprises a rail 38 also extending longitudinally of the chassis. The rail 38 is mounted on an inclined bracket 40 which, in turn, is mounted by a pair of bolts 42 which extend through holes in the rails 12 and 14 and nuts 43. The bolts 42 preferably extend all of the way through the rails 12 and 14 as shown in FIG. 4 to permit ready removal and selective positioning in a few of the several selected holes 44 in the inclined bracket 40. Due to the ability to select between the plurality of holes 44, the inclined bracket 40 is also capable of selective adjustment transversely along the rails 12 and 14.

The inclined bracket 40 comprises a pair of general trapazoidally shaped sides 46 and 48, which extend downwardly and are spaced from each other so as to straddle the thickness of the rails 12 and 14. An upper sloped surface 50 extends between the inclined bracket sides 46 and 48 and slopes downwardly in the direction of rail 24. The sloped surface 50 is preferably defined by bending over the upper edges of the sides 46 and 48 so as to define a sliding surface having a slot 52 preferably extending along the length of the sloped surface. The sides 46 and 48 are preferably held in rigid spaced relationship to each other and in straddling relationship to the rails 12 and 14 by end walls 54 and 56, as best seen in FIG. 3.

Figure 3:
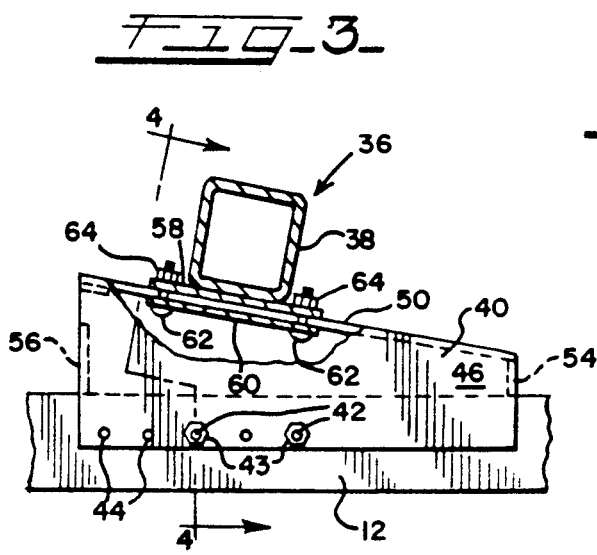
FIG. 3 is a partially broken, cross sectioned end elevational view of a preferred embodiment of adjustable mounting assembly for the header support constructed in accordance with principles of the present invention and as viewed substantially along lines 3—3 of FIG. 2.

The rail 38 is adjustably mounted to the sloped surface 50 of the inclined bracket 40 by a pair of plates 58 and 60 as best seen in FIGS. 3 and 4. Plate 58 overlies the sloped surface 50 and the slot 52, as best seen in FIG. 3, and is fixedly attached to the underside of the rail 38, such as by welding (not shown). Plate 60 underlies the sloped surface 50 and the slot 52. A pair of spaced bolts 62 are fixedly attached to plate 60 and extend upwardly from the plate through the slot 52 and through overlying holes in the plate 58. The bolts 62 are attached to the plate 58 by nuts 64 so that when the nuts 64 are loosened the plates 58 and 60 may be adjustably slid up or down the sloped surface 50 and when tightened they fixedly clamp that surface.

Although it is believed that the adjustment of the preferred embodiment of header transport thus far described will be apparent to those skilled in the art from the foregoing description, a brief description of the adjustment procedure will be described to follow.

Upon initial use of the header transport of the present invention, the transverse positioning of the rail 24 via bolts 32, and holes 34 and the longitudinal positioning of the header support brackets 26 via bolts 28 and holes 30, as shown in FIGS. 1 and 2, is first performed. In addition, the transverse positioning of the inclined bracket 40 via bolts 42, nuts 43 and holes 44 is also performed. Once these initial adjustments have been made, it has been found in practice that the only further adjustments that typically need be made in the continuing use of the transport of the present invention is the adjustment of the rail 38 to accommodate the wide range of headers which are currently available notwithstanding the nature of their use or the identity of their manufacturer.

In order to accomplish that adjustment so as to firmly support any given header H, all that need be done is to loosen the nuts 64, as shown in FIGS. 3 and 4. With the nuts 64 loosened but not completely removed, the plates 58 and 60 no longer clamp the rail 38 to the slotted sloped surface 50 of the inclined bracket 40. In this condition, the rail 38 and the plates may now be easily slid along and parallel to the sloped surface 50 to position the rail simultaneously in both the horizontal transverse and vertical directions so that when one portion of the bottom of the header H is brought to rest upon the header support brackets 26, another portion of the underside of the header H will firmly and stably rest upon and be supported by the rail 38. Once the rail 38 has been so positioned, the nuts 64 are again tightened to firmly clamp the rail 38 and its plates 58 and 60 in place along the sloped surface 50.

It will be appreciated that the inclined bracket 40, its plates 58 and 60 and support rail 38 are extremely simple in construction and in the operation needed to perform the adjustment. During adjustment, the rail 38 is capable of simultaneous adjustment in both the transverse direction relative to the chassis as well as in vertical elevation. In fact, the adjustment steps of the assembly of the present invention are so simple that they may readily be performed in the field by a single person. Moreover, the adjustment assembly of the present invention avoids the hazards to personnel which existed in some of the prior scissor-type adjustment assemblies and is capable of an exceptionally low profile and excellent stability during the transport.

It will be understood that the embodiment of the present invention which has been described is merely illustrative of one of the applications of the principles of the invention. Numerous modifications may be made by those skilled in the art without departing from the true spirit and scope of the invention.

I claim:

1. A transport for transporting a large bulky object, the transport having a chassis on wheels for rollably supporting the chassis, the chassis being formed of rails including a pair of rails spaced longitudinally from each other and extending transversely of the chassis, and first and second support means transversely spaced from each other to support transversely spaced portions of the object to be transported when the object is placed on the chassis, wherein the improvement in at least one of said support means comprises:

at least one bracket on one of the chassis rails and having a sloped surface thereon, and an elongate sloped slot on said bracket extending substantially parallel to said sloped surface;

a support element adapted to support the object; and adjustable mounting means mounting said support element for movement along said sloped slot in a direction substantially parallel to said sloped surface to effect movement of said support element simultaneously in both elevation and transversely of the chassis to permit adjustment of said support element to support one of said spaced portions of the object.

2. The transport of claim 1, wherein said sloped surface remains stationary during said adjustable movement of said support element.

3. The transport of claim 1, wherein said adjustable mounting means comprises plate means both overlying and underlying said slot, said plate means overlying said slot being fixed to said support element, and coupling means extending between said plate means and through said slot to releaseably clamp the plate means to said bracket.

4. The transport of claim 3, wherein said slot is in said sloped surface.

5. The transport of claim 2, wherein said adjustable mounting means comprises, plate means both overlying and underlying said slot, said plate means overlying said slot being fixed to said support element, and coupling means extending between said plate means and through said slot to releaseably clamp the plate means to said bracket.

6. The transport of claim 5, wherein said slot is in said sloped surface.

7. The transport of claim 1, including at least a pair of said brackets spaced from each other longitudinally of said chassis.

8. The transport of claim 1, wherein said sloped surface slopes downwardly toward the other of said support means.

9. The transport of claim 2, wherein said sloped surface slopes downwardly toward the other of said support means.

10. The transport of claim 3, wherein said sloped surface slopes downwardly toward the other of said support means.

11. The transport of claim 4, wherein said sloped surface slopes downwardly toward the other of said support means.

12. The transport of claim 1, including a longitudinally extending rail transversely spaced from said one support means and extending longitudinally of said chassis, the other support means being mounted on said longitudinally extending rail.

13. The transport of claim 12, including adjustable mounting means mounting said second support means for longitudinal movement along said longitudinally extending rail.

14. The transport of claim 12, including adjustable mounting means mounting said longitudinally extending rail for transverse movement along said pair of rails.

15. The transport of claim 13, including adjustable mounting means mounting said longitudinally extending rail for transverse movement along said pair of rails.

16. The transport of claim 1, including adjustable mounting means mounting said inclined bracket for transverse movement on the chassis.

17. The transport of claim 5, including adjustable mounting means mounting said inclined bracket for transverse movement on the chassis.

18. The transport of claim 1, wherein said support element comprises a rail extending longitudinally of said chassis.

19. The transport of claim 2, wherein said support element comprises a rail extending longitudinally of said chassis.

20. The transport of claim 3, wherein said support element comprises a rail extending longitudinally of said chassis.

21. The transport of claim 4, wherein said support element comprises a rail extending longitudinally of said chassis.

22. The transport of claim 3, wherein said plate means is selectably slideable along said sloped surface to adjust the position of said support element and clamps said support element to said sloped surface when the desired position has been achieved.

23. The transport of claim 5, wherein said plate means is selectably slideable along said sloped surface to adjust the position of said support element and clamps said support element to said sloped surface when the desired position has been achieved.

24. The transport of claim 1, wherein said adjustable mounting means includes plate mean both overlying and underlying said sloped surface, said plate means overlying said sloped surface being fixed to said support element, and coupling means extending between said plate element and past said sloped surface to releaseably clamp the plate means to said bracket.

25. The transport of claim 2, wherein said adjustable mounting means includes plate means both overlying and underlying said sloped surface, said plate means overlying said sloped surface being fixed to said support element, and coupling means extending between said plate means and past said sloped surface to releaseably clamp the plate means to said bracket.

26. The transport of claim 1, wherein said transport is constructed and arranged to transport a combine header.

27. The transport of claim 2, wherein said transport is constructed and arranged to transport a combine header.

28. The transport of claim 3, wherein said transport is constructed and arranged to transport a combine header.

29. The transport of claim 8, wherein said transport is constructed and arranged to transport a combine header.

30. The transport of claim 12, wherein said transport is constructed and arranged to transport a combine header.

31. The transport of claim 18, wherein said transport is constructed and arranged to transport a combine header.

* * * * *

UNITED STATES PATENT AND TRADEMARK OFFICE
CERTIFICATE OF CORRECTION

PATENT NO. : 5,040,825
DATED : August 20, 1991
INVENTOR(S) : Abe B. Kuhns

It is certified that error appears in the above-identified patent and that said Letters Patent is hereby corrected as shown below:

In claim 13, column 6, line 37, delete "second" and insert -- other --.

In claim 16, column 6, line 47, delete "inclined".

In claim 17, column 6, line 50, delete "inclined".

In claim 24, column 7, line 11, delete "element" and insert -- means --.

Signed and Sealed this

Fifth Day of January, 1993

Attest:

DOUGLAS B. COMER

Attesting Officer

Acting Commissioner of Patents and Trademarks